United States Patent Office 3,365,421
Patented Jan. 23, 1968

3,365,421
2-HYDROXY-4-ACRYLOXYETHOXYBENZOPHE-NONES AND HOMOPOLYMERS THEREOF
Robert Louis Horton, Warren Township, Somerset County, and Houston George Brooks, Somerset, N.J., assignors to American Cyanamid Company, Stamford, Conn., a corporation of Maine
No Drawing. Original application Oct. 11, 1965, Ser. No. 494,922, now Patent No. 3,313,866, dated Apr. 11, 1967. Divided and this application Mar. 9, 1966, Ser. No. 532,901
5 Claims. (Cl. 260—47)

This application is a division of application Ser. No. 494,922, filed Oct. 11, 1965, now U.S. Patent 3,313,866.

This invention relates to an improved stabilizing and ultraviolet light screening material. More particularly, it relates to new polymerized 2 - hydroxy - 4 - acrylyloxy-alkoxybenzophenones in which the alkoxy moiety has 2–3 carbons. It relates further to the use of these polymers, especially homopolymers, as ultra-violet absorbing materials. It relates still further to the new monomers which are useful in preparing the aforesaid copolymers and homopolymers useful themselves as light stabilizers for polymeric materials and further, useful for copolymerizing with various other monomers to form light-stable polymeric compositions.

A wide variety of materials has been proposed for ultraviolet absorbing use. These have found applications in two general areas, namely (1) in polymeric substrates as stabilizers against light, and (2) as light filters or screens capable of preventing the transmission of ultraviolet light from the light source to a lightsensitive object.

To be useful in both capacities, the compounds should satisfy various requirements including high ultraviolet absorptive power in the desirable wavelength range, little visible color, stability to heat and light, low volatility, non-toxicity compatibility at high concentrations with various substrates ease of manufacture, etc.

The use of a protective film is particularly desirable in those instances where it is not feasible to sufficiently stabilize the substrate by the direct addition of the stabilizer, as sometimes occurs when the stabilizer is incompatible with a substrate, or when the incorporation of a foreign substance in the substrate would interfere with the use of the latter for its intended purpose.

For certain purposes described above, it is desirable that the protective agent remain in the film without mitgrating into the substrate below. Unfortunately, most known light stabilizers are not satisfactory in this respect especially because of the high concentration required for effective filtering.

It is an object of the present invention to provide stabilizing materials which effectively perform the function of stabilizing the polymeric substrate into which they are incorporated. It is another object of this invention to provide stabilizers which are highly compatible with polymeric materials into which they can be incorporated in high concentrations, to thereby give light-stabilized materials capable of serving as U.V. absorbing screens. Other objects will become apparent hereinafter.

The present invention is based on the discovery of a new class of easily obtained monomers which are themselves light stabilizers and which can be copolymerized or homopolymerized to give new ultraviolet absorbing compositions useful under certain particular conditions where other known materials are not suitable. The new polymerized composition is a polymer, preferably homopolymerized product of a 2-hydroxy-4-acrylyloxyalkoxybenzophenone or homologs thereof. For special uses, as when the polymer is to be incorporated from solution into a polymeric substrate, the polymers are characterized further by an intrinsic viscosity within a limited range.

It should be recognized that the polymeric compositions of this invention can take several forms. They may be copolymers with other ethylenically unsaturated materials such as styrene, methylstyrene, acrylates, methylacrylates, acrylamide, acrylonitrile, methacrylonitrile, vinylacetate, vinylidene chloride, vinyl chloride, vinyl fluoride, ethylene, propylene, etc. They may be homopolymers of low or intermediate molecular weight. Just which form is used depends on the final end-use. In cases where the polymerized benzophenone is to be added to a polymeric substrate from a solution, it is preferable to form a low molecular weight polymer. Where the polymerized benzophenone is to be incorporated by milling, higher molecular weight forms may be desired.

Homopolymeric compositions of this invention are preferably low molecular weight polymers of 2-hydroxy-4-acrylyloxyalkoxybenzophenone and/or homologs thereof, i.e., a "poly(2 - hydroxy - 4 - acrylyloxyethoxybenzophenone)" with low intrinsic viscosity. Additionally, they desirably have good solubility in dimethylacetamide. At 30° C. they should be soluble in an amount of at least about 5%. The range of intrinsic viscosity encountered with the polymers having the required solubility is from about 0.05 to 0.8. The procedure by which intrinsic viscosity is measured is similar to that described in ASTM D–1601–59T except that the determinations are made at 30° C. using dimethylacetamide as the solvent.

The compositions of this invention have noteworthy ultraviolet absorptive properties, are compatible at high concentrations with film-forming materials, are stable, are not volatile and do not tend to migrate easily into other plastic substrates in contact with the filter film containing it.

These properties make them surprisingly suitable for special applications. One such special application is as the U.V. absorber in a filtering or screening film in which the substrate is a plastic such as a polyvinylhalide (e.g., polyvinylchloride and polyvinylfluoride), acrylics [e.g., poly(methylmethacrylate)], polystyrene, polyvinylidene chloride, impact polystyrene, ABS polymers, polycarbonate, or the like. Here the U.V. absorber protects the film itself and the composite film acts as a U.V. screen for anything which the film covers.

Such filter film material is extremely useful for protection of certain polymeric substrates which cannot be sufficiently stabilized by direct incorporation of a light stabilizer in sufficient amount. A specific application is for building panels which are to be used under extremely adverse conditions. It is often not possible to use enough additive to stabilize satisfactorily. By coating them with a film prepared in accordance with this invention, the panels can be properly protected for long periods of time. Moreover, since the U.V. absorber is applied only on the surface rather than throughout the panel, less is required.

In such applications, the film is placed in contact with the surface of the material to be protected. For good contact and permanence, adhesive materials are usually required. Here another problem arises in that the adhesive itself may be vulnerable to ultraviolet degradation. The use of the protective agent in the film also acts to protect and stabilize the adhesive.

The present invention has thus far been described as relating to a monomer, a copolymer and a homopolymer of 2-hydroxy-4-acrylyloxyalkoxybenzophenones wherein the alkoxy moiety has 2–3 carbons. It is clear that such obvious equivalents as the corresponding 4-methacrylyloxy derivatives can be just as gainfully employed. These equivalents are equally contemplated as part of the present invention. The monomers of use herein may be depicted by the following Formula I:

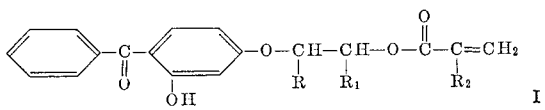

wherein R and $R_1$ are hydrogen or methyl, provided that at least one is hydrogen; and $R_2$ is hydrogen or methyl. Examples of useful monomers are 2-hydroxybenzophenones having as the 4-substituent any of the following:

(a) 2-acrylyloxyethoxy-
(b) 2-methacrylyloxyethoxy-
(c) 2-acrylyoxy-2-methylethoxy-
(d) 2-methacrylyloxy-2-methylethoxy-
(e) 2-acrylyloxy-1-methylethoxy-
(f) 2-methacrylyloxy-1-methylethoxy-.

The above monomers may be prepared by esterification, with acrylic or methacrylic acid, of the corresponding 2-hydroxy-4-(2-hydroxyethoxy)benzophenone. The latter compounds are conveniently obtained from 2,4-dihydroxybenzophenone and the appropriate chlorohydrin.

The polymeric product of this invention is prepared by polymerizing a compound of Formula I with or without other ethylenically unsaturated monomers. The polymerization should be carried out in such manner that the desired intrinsic viscosity and solubility requirements are met. This can be accomplished by carrying out the polymerization in several different ways.

In a solvent system using benzene, a chain transfer agent is normally required in proper amount. Suitable transfer agents include alcohols, phenols and the corresponding thio derivatives such as ethyl mercaptan, benzyl mercaptan, dodecyl mercaptan, octyl mercaptan, thiophenol, α-thionaphthol, ethanol, phenol, α-naphthol, etc. If the 2-hydroxy-4-acrylyloxyalkoxybenzophenone monomer or the methacrylyloxy analog is prepared from the reaction of acrylic or methacrylic acid and 2-hydroxy-4-β-hydroxyalkoxybenzophenone, it may be convenient to use 2,4-dihydroxybenzophenone as the chain stopper. A conventional polymerization initiator such as dibenzoyl peroxide or, preferably, azobis(isobutyronitrile), should be added to the reaction mixture.

If, in the above method of polymerization, dimethylacetamide is used as the solvent, then the addition of a chain transfer agent such as 2,4-dihydroxybenzophenone is not required.

The polymerization may also be carried out in an emulsion system using an emulsion in water. In this case, a suitable catalyst is potassium persulfate. Others of the same class are ammonium persulfate and combinations of potassium or ammonium persulfate with sodium bisulfite. Varying the amount of catalyst will, within limits, vary the intrinsic viscosity. It is preferred to use about 1 to 3%, based on the weight of the monomer, but within the range of 0.1% to 5.0% useful homopolymeric products are obtained. A suitable chain transfer agent in this case is dodecyl mercaptan. Concentrations of 0.05–1% based on the weight of the monomer are suitable. A preferred range is 0.1 to 0.5%.

Although it is not necessary to delicately control conditions for the preparation of the polymers of this invention, conditions must be used so that the product meets the required specifications as to viscosity and solubility. If high catalyst concentrations are used, reaction time, temperatures, and the concentration of the chain transfer agent should be adjusted to compensate for the greater tendency toward complete polymerization.

In the reaction in an aromatic solvent such as benzene, toluene, xylene, etc., useful products are obtained at temperatures from about 70° C. to about 110° C., using from about 5 to 10 parts of 2,4-dihydroxybenzophenone per 100 parts of monomer as the chain transfer agent. When run in dimethylacetamide, useful products are obtained at temperatures of about 60° C. to 110° C. In the emulsion system, the same temperatures are suitable.

In forming the homopolymers of the invention, minor amounts of the aforementioned other copolymerizable monomeric materials may be present in the polymerizable mix without producing adverse effects on the specified characteristics of the homopolymeric compositions.

In general, the copolymer and homopolymer are added to the substrate in a concentration suited to give the degree of protection necessary to withstand anticipated adverse conditions and also provide ultraviolet light screening as needed. For most situations, concentrations will fall within the range of 0.1 to 5.0% by weight of polymeric substrate. A good all-around concentration is about 0.5%. The monomer itself can be used as a light stabilizer at the same concentrations, either by incorporation as an additive in an already formed polymeric composition; or by copolymerization during the preparation of the polymeric composition. In the latter case, between 0.05 and 10.0% of the monomer is polymerized with the monomer from which the substrate is prepared.

The invention is further illustrated by the examples which follow.

EXAMPLE 1

*2-hydroxy-4-(2-acrylyloxyethoxy)benzophenone*

A mixture of 775 g. of 2-hydroxy-4-(2-hydroxyethoxy)-benzophenone, 238 g. of acrylic acid, 15 g. of p-toluenesulfonic acid monohydrate, 5 g. of hydroquinone and 300 ml. of benzene, was stirred and heated at reflux under a blanket of nitrogen. After the theoretical amount of water was removed by azeotropic distillation, 100 g. of filter aid was added and the mixture was filtered. The benzene was removed by distillation under vacuum and then 2.5 liters of cyclohexane was added with vigorous stirring. The solution was cooled slowly to 15° C. and the solid which separated was collected. There was obtained 904 g. (96.5% yield) of product.

EXAMPLE 2

*2-hydroxy-4-methacrylyloxyethoxybenzophenone*

The product is obtained by following the procedure of Example 1 except for the substitution of an equivalent amount of methacrylic acid for the acrylic acid therein.

EXAMPLE 3

*2-hydroxy-4-(2-acrylyloxy-2-methylethoxy) benzophenone*

The product is obtained by following the procedure of Example 1 except for the substitution of an equivalent amount of 2-hydroxy-4-(2-hydroxy-2-methylethoxy)benzophenone for the benzophenone used therein.

EXAMPLE 4

*2-hydroxy-4-(2-acrylyloxy-1-methylethoxy) benzophenone*

The product is obtained using the procedure of Example 1 except for the substitution of 2-hydroxy-4-(2-hydroxy-1-methylethoxy)benzophenone for the benzophenone used therein.

EXAMPLE 5

*Solution polymerization method (with chain transfer agent) poly[2-hydroxy-4-(2-acrylyloxyethoxy) benzophenone]*

A solution of 26.8 g. of the product of Example 1 containing 8.5% of 2,4-dihydroxybenzophenone in 150 cc. of benzene is heated to reflux, under nitrogen and 0.27 g. of azobis(isobutyronitrile) is added. After refluxing overnight, the solution is added slowly to 600 cc. of methanol with good stirring. After stirring for a short while, the crusty solid is removed, boiled with fresh methanol, filtered and dried. The product is soluble in dimethylacetamide to a greater extent than 5%.

EXAMPLE 6

*Solution polymerization (without chain transfer agent)*

A solution of 10 g. of the product of Example 1 in 50 ml. of dimethylacetamide is purged with nitrogen. After heating to 70° C., 0.1 g. of azobis(isobutyronitrile) is added and mixture is heated for 2½ hours. The solution is added to excess methanol and a small amount of saturated aqueous NaCl solution is added. The product which separates is filtered, washed with water and then methanol. The material so obtained is soluble in dimethylacetamide to a greater extent than 5%.

EXAMPLE 7

*Emulsion polymerization*

To 580 ml. of water, which was purged with nitrogen at the boiling point for twenty minutes, was added 100 g. of 2-hydroxy-4-(2-acrylyloxyethoxy)benzophenone, 4 g. of sodium lauryl sulfate, 4 g. of nonionic dispersing agent (Surfonic N–200), and 0.5 g. of dodecyl mercaptan. The mixture was stirred vigorously for five minutes, under nitrogen, and then 1 g. of potassium persulfate was added. The mixture was stirred and heated at 93–96° C. for 1.5 hours and then cooled to 40° C. and filtered. To the stirred filtrate was added slowly 800 ml. of methanol at 40–45° C. The precipitated polymer was then collected and washed with 2 liters of water (40° C.) and then with 500 ml. of methanol. After air-drying, there was obtained 74 g. of product which had an intrinsic viscosity of 0.17 in dimethylacetamide at 30° C. and was soluble in dimethylacetamide to an extent greater than 5%.

EXAMPLE 8

*Plastic substrates containing homopolymer*

The polymer products of this invention are incorporated into various plastic substrates, using polystyrene and polymethylmethacrylate as illustrative.

Chips of the substrate with the additive in 0.5% concentration are prepared by milling on a two-roll laboratory mill at 170–175° C. for five minutes and compression-molding at 175 to 180° C.

The following tables list various plastic formulations of this invention.

TABLE I.—POLYSTYRENE

Number:    Polymerized additive named as the monomer
1 _____ 2-hydroxy-4-(2-acrylyloxyethoxy)benzophenone
2 _____ 2-hydroxy-4-(2-methacrylyloxyethoxy)benzophenone
3 _____ 2-hydroxy-4-(2-acrylyloxy-2-methylethoxy)benzophenone
4 _____ 2-hydroxy-4-(2-acrylyloxy-1-methylethoxy)benzophenone Similar compatibility is found if films are instead prepared from polyvinylfluoride.

TABLE II.—POLYMETHYLMETHACRYLATE

Number:    Polymerized additive named as the monomer
1 _____ 2-hydroxy-4-(2-acrylyloxyethoxy)benzophenone
2 _____ 2-hydroxy-4-(2-methacrylyloxyethoxy)benzophenone
3 _____ 2-hydroxy-4-(2-acrylyloxy-2-methylethoxy)benzophenone
4 _____ 2-hydroxy-4-(2-acrylyloxy-1-methylethoxy)benzophenone

EXAMPLE 9

*Polyvinyl chloride stabilized with monomer of Example 1 polymer of Example 7*

The monomer of Example 1 and the polymer of Example 7 were incorporated into a rigid PVC formulation. Compression-molded 50-mil chips were prepared and exposed in the FS-BL unit with the following results.

TABLE III

| 0.5% Additive | Initial Yellow Index | Δ(YI) at 125 hrs. FS-BL Exposure |
|---|---|---|
| Control (no additive) | 3 | 15 |
| Monomer of Example 1 | 3 | 1 |
| Polymer of Example 7 | 6 | 0 |

The above additives were found to be compatible. Similar compatibility is found in polyvinyl fluoride.

What is claimed is:

1. A homopolymer derived from a monomer of the formula:

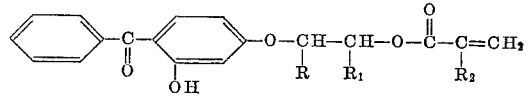

wherein R and $R_1$ are each hydrogen or methyl, no more than one being methyl; and $R_2$ is hydrogen or methyl.

2. The homopolymer of claim 1 wherein said homopolymer is characterized at 30° C. by an intrinsic viscosity of 0.05 to 0.8 and a solubility in dimethylacetamide of greater than 5%.

3. The homopolymer of claim 1 wherein the monomer is 2-hydroxy-4-(2-acrylyloxyethoxy)benzophenone.

4. A compound of the formula:

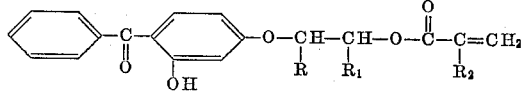

wherein R and $R_1$ are each hydrogen or methyl, no more than one being methyl; and $R_2$ is hydrogen or methyl.

5. The compound of claim 4 wherein R, $R_1$ and $R_2$ are hydrogen.

References Cited

FOREIGN PATENTS 990,312    4/1965    Great Britain.

JOSEPH L. SCHOFER, *Primary Examiner.*

C. HENDERSON, *Assistant Examiner.*